(12) United States Patent
Guan

(10) Patent No.: US 10,553,165 B2
(45) Date of Patent: Feb. 4, 2020

(54) METHOD AND APPARATUS FOR DETECTING HIGH-FREQUENCY COMPONENT IN IMAGE

(71) Applicant: SHENZHEN CHINA STAR OPTOELECTRONICS TECHNOLOGY CO., LTD., Shenzhen, Guangdong (CN)

(72) Inventor: Xiaoliang Guan, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 197 days.

(21) Appl. No.: 15/749,013

(22) PCT Filed: Jan. 12, 2018

(86) PCT No.: PCT/CN2018/072507
§ 371 (c)(1),
(2) Date: Jan. 30, 2018

(87) PCT Pub. No.: WO2019/127667
PCT Pub. Date: Jul. 4, 2019

(65) Prior Publication Data
US 2019/0385545 A1    Dec. 19, 2019

(30) Foreign Application Priority Data

Dec. 25, 2017    (CN) .......................... 2017 1 1423946

(51) Int. Cl.
*G06T 7/00*      (2017.01)
*G09G 3/36*      (2006.01)
*G06T 7/90*      (2017.01)

(52) U.S. Cl.
CPC .............. *G09G 3/3607* (2013.01); *G06T 7/90* (2017.01); *G06T 2207/10024* (2013.01); *G06T 2207/30121* (2013.01)

(58) Field of Classification Search
CPC ..................... G09G 3/00–38; G06T 7/00–97
See application file for complete search history.

(56) References Cited

U.S. PATENT DOCUMENTS 6,421,090 B1 *  7/2002  Jiang ...................... H04N 7/012
                                                    348/448
8,577,180 B2 * 11/2013  Azuma .................. H04N 19/80
                                                    283/100

(Continued)

FOREIGN PATENT DOCUMENTS

CN         109326245 A   *   2/2019

*Primary Examiner* — Sean T Motsinger
(74) *Attorney, Agent, or Firm* — Hemisphere Law, PLLC; Zhigang Ma

(57) ABSTRACT

The present disclosure provides a method and an apparatus of detecting high-frequency components in an image. The method using a first grayscale difference, a second grayscale difference to calculate the target grayscale difference with the target grayscale difference algorithm, comparing the target grayscale difference with a preset grayscale threshold value to determine whether the image pixel to be detected is a high-frequency image pixel, and adjusting the actual grayscale value of the high-frequency image pixel to reduce the difference between the actual grayscale value of the high-frequency image pixel and the original grayscale value. It can optimize the detection process of high-frequency components in the image and improve the poor display caused by the color shift compensation algorithm to improve the display quality.

11 Claims, 3 Drawing Sheets

(56) References Cited

U.S. PATENT DOCUMENTS

| | | | | |
|---|---|---|---|---|
| 9,025,903 B2* | 5/2015 | Wada | ............... | G06T 5/002 |
| | | | | 382/254 |
| 2003/0068085 A1* | 4/2003 | Said | ............... | G06T 7/12 |
| | | | | 382/170 |
| 2005/0030396 A1* | 2/2005 | Park | ............... | G06T 3/403 |
| | | | | 348/252 |
| 2005/0273212 A1* | 12/2005 | Hougen | ............... | G06K 9/00805 |
| | | | | 701/1 |
| 2006/0269159 A1* | 11/2006 | Kim | ............... | G06T 5/50 |
| | | | | 382/256 |
| 2007/0188525 A1* | 8/2007 | Yamanaka | ............... | H04N 5/20 |
| | | | | 345/690 |
| 2010/0002951 A1* | 1/2010 | Zhai | ............... | G06K 9/3266 |
| | | | | 382/266 |
| 2016/0163027 A1* | 6/2016 | Gal | ............... | G06T 5/003 |
| | | | | 382/167 |
| 2018/0313940 A1* | 11/2018 | Wu | ............... | G01S 17/89 |
| 2019/0043434 A1* | 2/2019 | Chen | ............... | G09G 3/3614 |

* cited by examiner

METHOD AND APPARATUS FOR DETECTING HIGH-FREQUENCY COMPONENT IN IMAGE

RELATED APPLICATIONS

The present application is a National Phase of International Application Number PCT/CN2018/072507, filed on Jan. 12, 2018, and claims the priority of China Application 201711423946.9, filed on Dec. 25, 2017.

FIELD OF THE DISCLOSURE

The present disclosure relates to a display technology field, and more particularly to a method and an apparatus for detecting high-frequency components in an image.

BACKGROUND OF THE DISCLOSURE

Liquid crystal display (LCD) has many advantages, such as thin body, power saving, no radiation, and has been widely used. Such as: LCD TVs, mobile phones, personal digital assistants (PDAs), digital cameras, computer screens or laptop screens, etc., in the field of flat panel display dominant.

Most of the liquid crystal displays on the market are backlight type liquid crystal displays, which include a liquid crystal display panel and a backlight module. The operating principle of the liquid crystal display panel is to inject liquid crystal molecules between the thin film transistor array substrate (TFT Array Substrate) and the color filter (CF) substrate and apply a driving voltage on the two substrates to control the rotation direction of the liquid crystal molecules, so as to refract the light of the backlight module to generate a picture.

Due to the optical anisotropy of liquid crystal molecules, there is a problem of color shift in a large viewing angle in a liquid crystal panel. In order to solve the color shift phenomenon under a large viewing angle of a liquid crystal panel, the prior art proposes a color shift compensation algorithm by preprocessing an input data signal. The color shift compensation algorithm specific implementation steps include: respectively acquiring the first display grayscale value and the second display grayscale value by the original grayscale values of the respective primary color components of the respective image pixels of the image to be displayed, respectively controlling the display brightness of two sub-pixels of the same color on the liquid crystal panel by using the first display grayscale value and the second display grayscale value. Wherein the first display grayscale value is greater than the second display grayscale value such that the driving voltages applied to the two sub-pixels are not the same so that the liquid crystal molecules of the two sub-pixels are deflected to different angles, so as to viewing the screen at different angles can get better viewing results, to achieve the purpose of reducing color cast. Wherein an image is usually composed of a plurality of image pixels, each image pixel includes three primary color components of red, green and blue, in driving an image display, the brightness of the primary color component is controlled by providing a grayscale value for display for each primary color component of each image pixel so that the primary color component displays a corresponding color, thereby realizing the display of the image. In one image pixel, each of the primary color components controls two sub-pixels of the same color and adjacent to each other, that is, the red component correspondingly controls two adjacent red sub-pixels, the green component correspondingly controls two adjacent green sub-pixels, the blue component correspondingly controls two adjacent blue sub-pixels, so that the display brightness of the corresponding two red sub-pixels is respectively controlled by the first display grayscale and the second display grayscale generated by the original grayscale values of the red component, the display brightness of the corresponding two green sub-pixels is respectively controlled by the first display grayscale and the second display grayscale generated by the original grayscale values of the green component, the display brightness of the corresponding two blue sub-pixels is respectively controlled by the first display grayscale and the second display grayscale generated by the original grayscale values of the blue component. The display brightness of each image pixel is a mixture of the display brightness of its corresponding primary color component, the display brightness of each primary color component is a mixture of the display brightness of its corresponding two sub-pixels. Generally, in order to keep the display brightness of the two sub-pixels controlled by the original grayscales consistent with the display brightness of the two sub-pixels controlled by the first display grayscale and the second display grayscale. It is generally set that the sum of the display brightness corresponding to the first display grayscale value and the display brightness corresponding to the second display grayscale value is equal to twice the display brightness corresponding to the original grayscale value.

In addition, in the image processing, the image where the brightness or grayscale changes intensely is called the high-frequency component, otherwise the low-frequency component. In the prior art, the detection of the high-frequency components in the image is limited to the detected image pixels and the image pixels adjacent thereto, and the detection range is small. In this case, high-frequency components after the color shift compensation algorithm will appear grainy, resulting in reduced display quality.

SUMMARY OF THE DISCLOSURE

An object of the present disclosure is to provide a method for detecting high-frequency components in an image, which can optimize the detection process of high-frequency components in an image and improve the display quality due to the display defect caused by the color shift compensation algorithm.

Another object of the present disclosure is to provide an apparatus for detecting high-frequency components in an image, which can optimize the detection process of high-frequency components in the image and improve the display quality due to the display defect caused by the color shift compensation algorithm.

To achieve the above object, the present disclosure provides a method for detecting high-frequency components in an image, including the following steps:

step S1, acquiring an original grayscale value of image pixels in a to-be-processed image, the image pixels including: an image pixel to be detected, an image pixel in a first layer and an image pixel in a second layer;

the image pixel in the first layer surrounding the image pixel to be detected, the image pixel in the second layer surrounding the image pixel in the first layer;

step S2, calculating a first grayscale difference that is a maximum value of a difference between the original grayscale value of the image pixel to be detected and the original grayscale value of each image pixel in the first layer;

step S3, calculating a second grayscale difference that is a maximum value of a difference between the original grayscale value of the image pixel to be detected and the original grayscale value of each image pixel in the second layer;

step S4, calculating the target grayscale difference according to a target grayscale difference algorithm, the first grayscale difference and the second grayscale difference;

step S5, comparing the target grayscale difference with a preset grayscale threshold value, if the target grayscale difference is greater than the grayscale threshold value, determining that the image pixel to be detected is a high-frequency image pixel; otherwise, determining that the image pixel to be detected is a low-frequency image pixel.

When the image pixel to be detected is a high-frequency image pixel, the method further includes:

step S6, adjusting an actual grayscale value of the high-frequency image pixel according to a preset adjustment algorithm and the target grayscale difference to reduce an absolute difference between the actual grayscale value and the original grayscale value of the high-frequency image pixel;

the actual grayscale value is a grayscale value acquired after the original grayscale value of the high-frequency image pixel is compensated for color shift.

The target grayscale difference algorithm in step S4 is: $F=a \times FA1+b \times FA2$, where F is the target grayscale difference, FA1 is the first grayscale difference, FA2 is the second grayscale difference, a is a preset first weight value, and b is a preset second weight value.

Each image pixel in step S1 includes a first primary color component, a second primary color component, and a third primary color component.

The original grayscale value of each image pixel includes the original grayscale value of the first primary color component, the original grayscale value of the second primary color component, and the original grayscale value of the third primary color component.

The difference between the original grayscale value of the image pixel to be detected and the original grayscale value of an image pixel in the first layer is: a maximum value of a difference between the original grayscale value of the first primary color component in the image pixel to be detected and the original grayscale value of the first primary color component in the image pixel in the first layer, a difference between the original grayscale value of the second primary color component in the image pixel to be detected and the original grayscale value of the second primary color component in the image pixel in the first layer, and a difference between the original grayscale value of the third primary color component in the image pixel to be detected and the original grayscale value of the third primary color component in the image pixel in the first layer.

The difference between the original grayscale value of the image pixel to be detected and the original grayscale value of an image pixel in the second layer is: a maximum value of a the difference between the original grayscale value of the first primary color component in the image pixel to be detected and the original grayscale value of the first primary color component in the image pixel in the second layer, a difference between the original grayscale value of the second primary color component in the image pixel to be detected and the original grayscale value of the second primary color component in the image pixel in the second layer, and a difference between the original grayscale value of the third primary color component in the image pixel to be detected and the original grayscale value of the third primary color component in the image pixel in the second layer.

The preset adjustment algorithm in step S6 is: $L'=(L-L0) \times C+L0$, where L' is an actual grayscale value adjusted by an adjusting algorithm, L0 is an original grayscale value of a high-frequency image pixel, L is an actual grayscale value of a high-frequency image pixel before being adjusted by the adjustment algorithm, C is a preset adjustment coefficient, a value range of the adjustment coefficient is 0~1, and the adjustment coefficient decreases as the target grayscale difference increases.

The present disclosure further provides an apparatus for detecting high-frequency components in an image, including: an acquiring unit, a first calculating unit connected to the acquiring unit, a second calculating unit connected to the first calculating unit, and a determining unit connected to the second calculating unit.

The acquiring unit is for acquiring an original grayscale value of image pixels in a to-be-processed image, the image pixels including: an image pixel to be detected, an image pixel in a first layer and an image pixel in a second layer.

The first calculating unit is for calculating a first grayscale difference and a second grayscale difference, the first grayscale difference is a maximum value of a difference between the original grayscale value of the image pixel to be detected and the original grayscale value of each image pixel in the first layer; the second grayscale difference is a maximum value of a difference between the original grayscale value of the image pixel to be detected and the original grayscale value of each image pixel in the second layer.

The second calculating unit is for calculating the target grayscale difference according to a target grayscale difference algorithm, the first grayscale difference and the second grayscale difference.

The determining unit is for comparing the target grayscale difference with a preset grayscale threshold value, if the target grayscale difference is greater than the grayscale threshold value, determining that the image pixel to be detected is a high-frequency image pixel; otherwise, determining that the image pixel to be detected is a low-frequency image pixel.

The apparatus for detecting high-frequency components in an image further includes: an adjusting unit connected to the determining unit.

The determining unit is for adjusting an actual grayscale value of the high-frequency image pixel according to a preset adjustment algorithm and the target grayscale difference to reduce an absolute difference between the actual grayscale value and the original grayscale value of the high-frequency image pixel; the actual grayscale value is a grayscale value acquired after the original grayscale value of the high-frequency image pixel is compensated for color shift.

The target grayscale difference algorithm in step S4 is: $F=a \times FA1+b \times FA2$, where F is the target grayscale difference, FA1 is the first grayscale difference, FA2 is the second grayscale difference, a is a preset first weight value, and b is a preset second weight value.

Each image pixel includes a first primary color component, a second primary color component and a third primary color component arranged in sequence.

The original grayscale value of each image pixel includes the original grayscale value of the first primary color component, the original grayscale value of the second primary color component, and the original grayscale value of the third primary color component.

The difference between the original grayscale value of the image pixel to be detected and the original grayscale value of an image pixel in the first layer is: a maximum value of a difference between the original grayscale value of the first primary color component in the image pixel to be detected and the original grayscale value of the first primary color component in the image pixel in the first layer, a difference between the original grayscale value of the second primary color component in the image pixel to be detected and the original grayscale value of the second primary color component in the image pixel in the first layer, and a difference between the original grayscale value of the third primary color component in the image pixel to be detected and the original grayscale value of the third primary color component in the image pixel in the first layer.

The difference between the original grayscale value of the image pixel to be detected and the original grayscale value of an image pixel in the second layer is: a maximum value of a difference between the original grayscale value of the first primary color component in the image pixel to be detected and the original grayscale value of the first primary color component in the image pixel in the second layer, a difference between the original grayscale value of the second primary color component in the image pixel to be detected and the original grayscale value of the second primary color component in the image pixel in the second layer, and a difference between the original grayscale value of the third primary color component in the image pixel to be detected and the original grayscale value of the third primary color component in the image pixel in the second layer.

The preset adjustment algorithm is: $L'=(L-L0)\times C+L0$, where L' is an actual grayscale value adjusted by an adjusting algorithm, L0 is an original grayscale value of a high-frequency image pixel, L is an actual grayscale value of a high-frequency image pixel before being adjusted by the adjustment algorithm, C is a preset adjustment coefficient, a value range of the adjustment coefficient is 0~1, and the adjustment coefficient decreases as the target grayscale difference increases.

The present disclosure further provides a method for detecting high-frequency components in an image includes the following steps:

step S1, acquiring an original grayscale value of image pixels in a to-be-processed image, the image pixels including: an image pixel to be detected, an image pixel in a first layer and an image pixel in a second layer;

the image pixel in the first layer surrounding the image pixel to be detected, the image pixel in the second layer surrounding the image pixel in the first layer;

step S2, calculating a first grayscale difference that is a maximum value of a difference between the original grayscale value of the image pixel to be detected and the original grayscale value of each image pixel in the first layer;

step S3, calculating a second grayscale difference that is a maximum value of a difference between the original grayscale value of the image pixel to be detected and the original grayscale value of each image pixel in the second layer;

step S4, according to a target grayscale difference algorithm, the first grayscale difference and the second grayscale difference to calculate the target grayscale difference;

step S5, comparing the target grayscale difference with a preset grayscale threshold value, if the target grayscale difference is greater than the grayscale threshold value, determining that the image pixel to be detected is a high-frequency image pixel; otherwise, determining that the image pixel to be detected is a low-frequency image pixel;

wherein when the image pixel to be detected is a high-frequency image pixel, the method further includes:

step S6, adjusting an actual grayscale value of the high-frequency image pixel according to a preset adjustment algorithm and the target grayscale difference to reduce an absolute difference between the actual grayscale value and the original grayscale value of the high-frequency image pixel;

the actual grayscale value is a grayscale value acquired after the original grayscale value of the high-frequency image pixel is compensated for color shift;

wherein the target grayscale difference algorithm in step S4 is: $F=a\times FA1-Fb\times FA2$, where F is the target grayscale difference, FA1 is the first grayscale difference, FA2 is the second grayscale difference, a is a preset first weight value, and b is a preset second weight value;

wherein each image pixel in step S1 includes a first primary color component, a second primary color component, and a third primary color component;

the original grayscale value of each image pixel includes the original grayscale value of the first primary color component, the original grayscale value of the second primary color component, and the original grayscale value of the third primary color component;

the difference between the original grayscale value of the image pixel to be detected and the original grayscale value of an image pixel in the first layer is: a maximum value of a difference between the original grayscale value of the first primary color component in the image pixel to be detected and the original grayscale value of the first primary color component in the image pixel in the first layer; a difference between the original grayscale value of the second primary color component in the image pixel to be detected and the original grayscale value of the second primary color component in the image pixel in the first layer, and a difference between the original grayscale value of the third primary color component in the image pixel to be detected and the original grayscale value of the third primary color component in the image pixel in the first layer;

the difference between the original grayscale value of the image pixel to be detected and the original grayscale value of an image pixel in the second layer is: a maximum value of a difference between the original grayscale value of the first primary color component in the image pixel to be detected and the original grayscale value of the first primary color component in the image pixel in the second layer; a difference between the original grayscale value of the second primary color component in the image pixel to be detected and the original grayscale value of the second primary color component in the image pixel in the second layer, and a difference between the original grayscale value of the third primary color component in the image pixel to be detected and the original grayscale value of the third primary color component in the image pixel in the second layer;

wherein the preset adjustment algorithm in step S6 is: $L'=(L-L0)\times C+L0$, where L' is an actual grayscale value adjusted by an adjusting algorithm, L0 is an original grayscale value of a high-frequency image pixel; L is an actual grayscale value of a high-frequency image pixel before being adjusted by the adjustment algorithm, C is a preset adjustment coefficient; a value range of the adjustment coefficient is 0~1, and the adjustment coefficient decreases as the target grayscale difference increases.

The beneficial effects of the present disclosure are as follows: the present disclosure provides a method of detecting high-frequency components in an image, using the maximum value of the difference between the original grayscale value of the image pixel to be detected and the original grayscale value of each image pixel in the first layer as the first grayscale difference, using the maximum value of the difference between the original grayscale value of the image pixel to be detected and the original grayscale value of each image pixel located at the second layer as the second grayscale difference, calculating the target grayscale difference according to the target grayscale difference algorithm, the first grayscale difference and the second grayscale difference, comparing the target grayscale difference with a preset grayscale threshold value to determine whether the image pixel to be detected is a high-frequency image pixel, and adjusting the actual grayscale value of the high-frequency image pixel to reduce the difference between the actual grayscale value of the high-frequency image pixel and the original grayscale value. It can optimize the detection process of high-frequency components in the image and improve the poor display caused by the color shift compensation algorithm to improve the display quality. The present disclosure also provides an apparatus for detecting high-frequency components in an image, which can optimize the detection process of high-frequency components in the image, improve the display defect caused by adopting the color shift compensation algorithm, and improve the display quality.

BRIEF DESCRIPTION OF THE DRAWINGS

For further understanding of the features and technical contents of the present disclosure, reference should be made to the following detailed description and accompanying drawings of the present disclosure. However, the drawings are for reference only and are not intended to limit the present disclosure.

DETAILED DESCRIPTION OF PREFERRED EMBODIMENTS

To further illustrate the technical means adopted by the present disclosure and the effects thereof, the following describes in detail the preferred embodiments of the present disclosure and the accompanying drawings.

Figure 1:
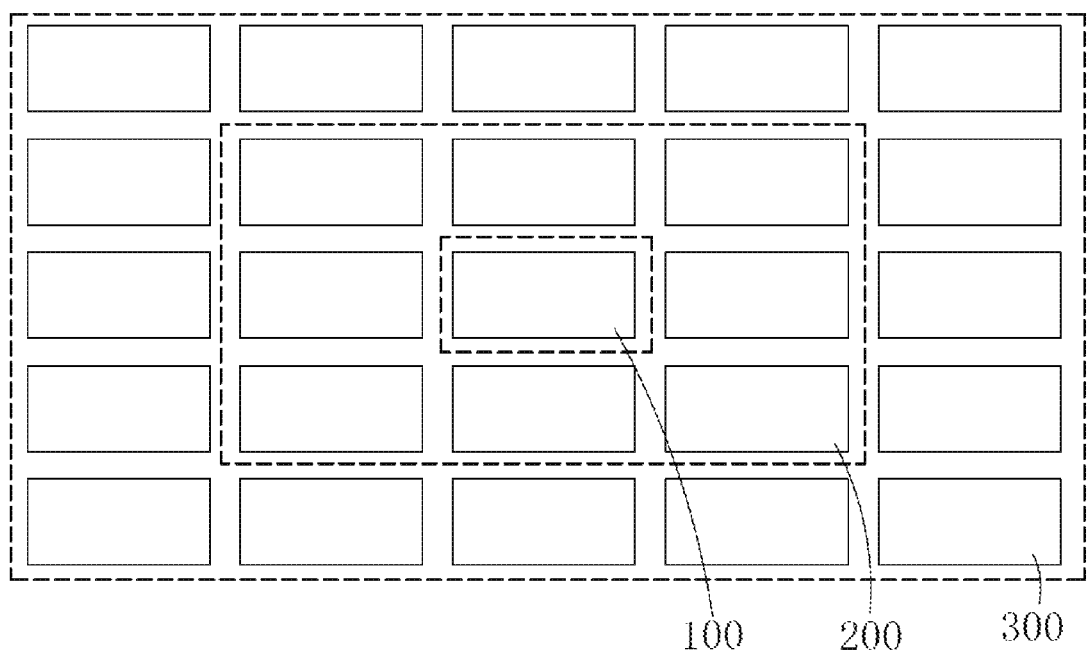
FIG. 1 is a schematic diagram of steps S1 to S3 of the method for detecting high-frequency components in an image according to the present disclosure.
Figure 2:
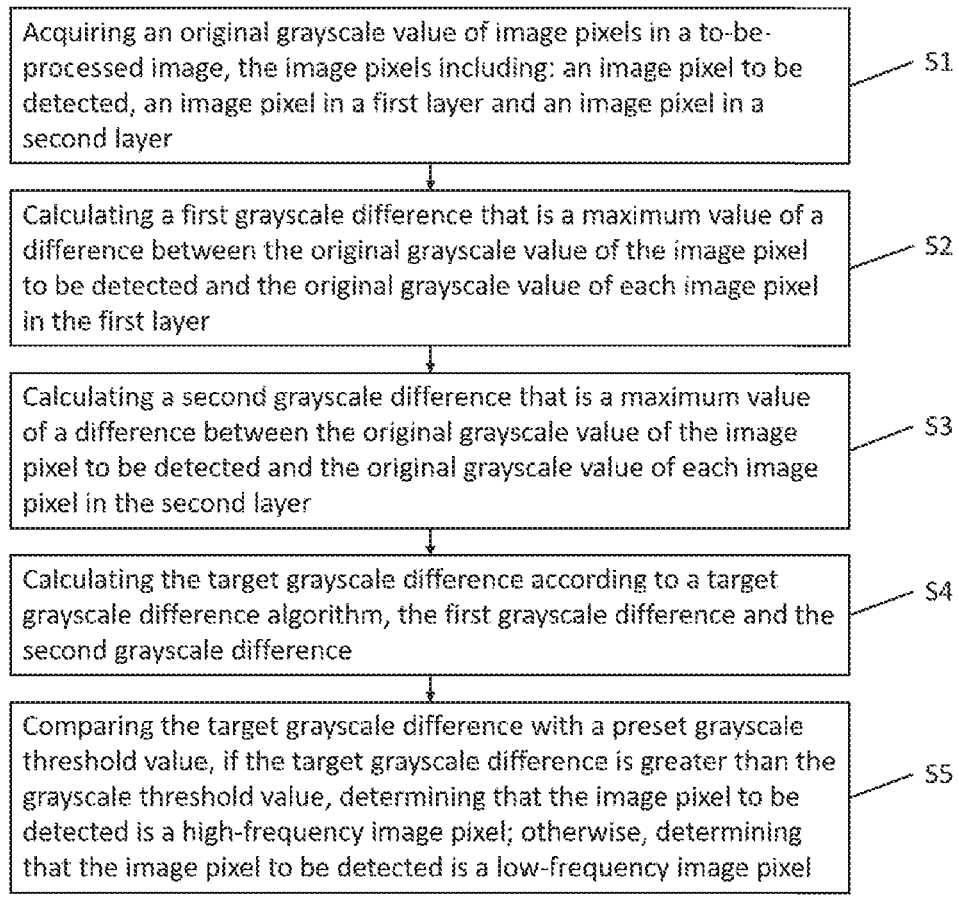
FIG. 2 is a flow chart of a method for detecting high-frequency components in an image according to the present disclosure.

Referring to FIG. 2, and in combination with FIG. 1, the present disclosure provides a method for detecting high-frequency components in an image, including the following steps.

Step S1, acquiring an original grayscale value of image pixels in a to-be-processed image, the image pixels including: an image pixel to be detected 100, an image pixel in a first layer 200 and an image pixel in a second layer 300.

The image pixel in the first layer 200 surrounding the image pixel 100 to be detected, the image pixel in the second layer 300 surrounding the image pixel in the first layer 200.

Specifically, each image to be processed is composed of a plurality of image pixels, each of which includes a first primary color component, a second primary color component and a third primary color component. The original grayscale values of the image pixels include the original grayscale values of the first primary color component, the second primary color component and the third primary color component. The display of the image is achieved by providing a grayscale value for display for each primary color component of each image pixel to control the brightness of the primary color component so that the primary color component displays a corresponding color. Preferably, the first primary color component, the second primary color component, and the third primary color component are respectively a red component, a green component and a blue component.

It may be understood that in other embodiments of the present disclosure, each of the image pixels may further include a fourth primary color component, and the fourth primary color component may appear white.

Further, as shown in FIG. 1, in general, the image pixel to be detected 100, the image pixel in the first layer 200, and the image pixel in the second layer 300 are arranged in 5 rows and 5 columns. The image pixel to be detected 100 is located at the center, that is, Line 3 Column 3, the image pixel in the first layer 200 surrounds the image pixel to be detected 100, respectively, located in Line 2 Column 2, Line 2 Column 3, Line 2 Column 4, Line 3 Column 2, Line 3 Column 4, Line 4 Column 2, Line 4 Column 3 and Line 4 Column 4 of a total of eight. The remaining 16 image pixels are the image pixels in the second layer 300. Obviously, the image pixels in the second layer 300 surround the image pixels in the first layer 200.

It is understandable that, when the image pixel to be detected 100 is located at an edge or a corner of the image, the image pixel to be detected 100, the image pixel in the first layer 200, and the image pixel in the second layer 300 will not be enough to be arranged in 5 rows and 5 columns. For example, when the image pixel to be detected 100 is located at the left edge of the image to be processed, the image pixel to be detected 100, the image pixel in the first layer 200, and the image pixel in the second layer 300 can only be arranged in 5 rows and 3 columns, the image pixel to be detected 100 is located in Line 3 Column 1, the image pixel in the first layer 200 is located in Line 2 Column 1, Line 2 Column 2, Line 3 Column 2, Line 4 Column 1 and Line 4 Column 2 of a total of five. The remaining nine image pixels are the image pixels in the second layer 300. When the image pixel 100 to be detected is located at the right edge, the top edge, or the bottom edge, it is similar to when it is located at the left edge of the image to be processed, not repeat them here. When the image pixel to be detected 100 is located at the lower left corner of the image to be processed, the image pixel to be detected 100, the image pixel in the first layer 200, and the image pixel in the second layer 300 can only be arranged in three rows and three columns. The image pixel to be detected 100 is located in Line 1 Column 1, the image pixel in the first layer 200 is located in Line 2 Column 1, Line 2 Column 2, and Line 1 Column 2 of a total of three. The remaining six image pixels are image pixels in the second layer 300. When the image pixel 100 to be detected is located in the upper left corner, the upper right corner and the lower right corner, it is similar to that when it is located in the lower left corner of the to-be-processed image, and details are not described herein again.

Step S2, calculating a first grayscale difference that is a maximum value of a difference between the original grayscale value of the image pixel to be detected 100 and the original grayscale value of each image pixel in the first layer 200.

The difference between the original grayscale value of the image pixel to be detected 100 and the original grayscale value of an image pixel in the first layer 200 is: a maximum value of a difference between the original grayscale value of the first primary color component in the image pixel to be detected 100 and the original grayscale value of the first primary color component in the image pixel in the first layer 200, the difference between the original grayscale value of the second primary color component in the image pixel to be detected 100 and the original grayscale value of the second primary color component in the image pixel in the first layer 200, and the difference between the original grayscale value of the third primary color component in the image pixel to be detected 100 and the original grayscale value of the third primary color component in the image pixel in the first layer 200. It should be understood that each of the above differences are absolute differences and no negative values exist.

For example, taking the arrangement of the image pixel to be detected 100, the image pixel in the first layer 200 and the image pixel in the second layer 300 into 5 rows and 5 columns as an example, the calculation process in step S2 is as follows:

$$F1=\text{Max}(|R1-R0|,|B1-B0|,|G1-G0|)$$

$$F2=\text{Max}(|R2-R0|,|B2-B0|,|G2-G0|)$$

$$F3=\text{Max}(|R3-R0|,|B3-B0|,|G3-G0|)$$

$$F4=\text{Max}(|R4-R0|,|B3-B0|,|G4-G0|)$$

$$F5=\text{Max}(|R5-R0|,|B5-B0|,|G5-G0|)$$

$$F6=\text{Max}(|R6-R0|,|B6-B0|,|G6-G0|)$$

$$F7=\text{Max}(|R7-R0|,|B7-B0|,|G7-G0|)$$

$$F8=\text{Max}(|R8-R0|,|B8-B0|,|G8-G0|)$$

$$FA1=\text{Max}(F1,F2,F3,F4,F5,F6,F7,F8)$$

Wherein R0, G0, and B0 respectively represent the original grayscale values of the first primary color component, the second primary color component, and the third primary color component in the image pixel to be detected 100, R1 to R8 respectively represent the original grayscale values of the first primary color components of the eight image pixels located in the first layer 200, G1 to G8 respectively represent the original grayscale values of the second primary color components of the eight image pixels located in the first layer, B1 to B8 respectively represent the original grayscale values of the third primary color components of the eight image pixels located in the first layer 200, F1 to F8 respectively represent the difference between the original grayscale values of the eight image pixels located in the first layer 200 and the image pixel to be detected 100, and FA1 is the first grayscale difference.

Step S3, calculating a second grayscale difference that is a maximum value of a difference between the original grayscale value of the image pixel to be detected 100 and the original grayscale value of each image pixel in the second layer 300.

The difference between the original grayscale value of the image pixel to be detected 100 and the original grayscale value of an image pixel in the second layer 200 is: a maximum value of a difference between the original grayscale value of the first primary color component in the image pixel to be detected 100 and the original grayscale value of the first primary color component in the image pixel in the second layer 300, the difference between the original grayscale value of the second primary color component in the image pixel to be detected 100 and the original grayscale value of the second primary color component in the image pixel in the second layer 300, and the difference between the original grayscale value of the third primary color component in the image pixel to be detected 100 and the original grayscale value of the third primary color component in the image pixel in the second layer 300.

For example, taking the arrangement of the image pixel to be detected 100, the image pixel in the first layer 200 and the image pixel in the second layer 300 into 5 rows and 5 columns as an example, the calculation process in step S3 is as follows:

$$F9=\text{Max}(|R9-R0|,|B9-B0|,|G9-G0|)$$

$$F10=\text{Max}(|R10-R0|,|B10-B0|,|G10-G0|)$$

$$F11=\text{Max}(|R11-R0|,|B13-B0|,|G11-G0|)$$

$$F12=\text{Max}(|R12-R0|,|B12-B0|,|G12-G0|)$$

$$F13=\text{Max}(|R13-R0|,|B13-B0|,|G13-G0|)$$

$$F14=\text{Max}(|R14-R0|,|B14-B0|,|G14-G0|)$$

$$F15=\text{Max}(|R15-R0|,|B15-B0|,|G15-G0|)$$

$$F16=\text{Max}(|R16-R0|,|B16-B0|,|G16-G0|)$$

$$F17=\text{Max}(|R17-R0|,|B17-B0|,|G17-G0|)$$

$$F18=\text{Max}(|R18-R0|,|B18-B0|,|G18-G0|)$$

$$F19=\text{Max}(|R19-R0|,|B19-B0|,|G19-G0|)$$

$$F20=\text{Max}(|R20-R0|,|B20-B0|,|G20-G0|)$$

$$F21=\text{Max}(|R21-R0|,|B21-B0|,|G21-G0|)$$

$$F22=\text{Max}(|R22-R0|,|B22-B0|,|G22-G0|)$$

$$F23=\text{Max}(|R23-R0|,|B23-B0|,|G23-G0|)$$

$$F24=\text{Max}(|R24-R0|,|B24-B0|,|G24-G0|)$$

$$FA2=\text{Max}(F9,F10,F11,F12,F13,F14,F15,F16,F17,\\F18,F19,F20,F21,F22,F23,F24)$$

Wherein R0, G0, and B0 respectively represent the original grayscale values of the first primary color component, the second primary color component, and the third primary color component in the image pixel to be detected 100, R9 to R24 respectively represent the original grayscale values of the first primary color components of the sixteen image pixels located in the second layer 300, G9 to G24 respectively represent the original grayscale values of the second primary color components of the 16 image pixels located in the second layer 300, B9 to B24 respectively represent the original grayscale values of the third primary color components of the sixteen image pixels located in the second layer 300, F9 to F24 respectively represent the difference between the original grayscale values of the 16 image pixels located in the second layer 300 and the image pixel to be detected 100, and FA2 represents the second grayscale difference.

Step S4, calculating the target grayscale difference according to a target grayscale difference algorithm, the first grayscale difference and the second grayscale difference.

The target grayscale difference algorithm in step S4 is: F=a×FA1+b×FA2, where F is the target grayscale difference, FA1 is the first grayscale difference, FA2 is the second grayscale difference, a is a preset first weight value, and b is a preset second weight value. By adjusting the specific sizes of a and b, the target grayscale difference can be changed.

Step S5, comparing the target grayscale difference with a preset grayscale threshold value, if the target grayscale difference is greater than the grayscale threshold value, determining that the image pixel to be detected 100 is a high-frequency image pixel; otherwise, determining that the image pixel to be detected 100 is a low-frequency image pixel.

Specifically, in a display panel that does not use a color shift compensation algorithm for color shift compensation, each of the primary color component control display sub-panels in each image pixel performs display. That is, one image pixel includes three sub-pixels, and each sub-pixel corresponds to a primary color component.

In a display panel adopting a color shift compensation algorithm for color shift compensation, each of two primary color components in each image pixel controls display of two sub-pixels in the display panel. That is, one image pixel includes six sub-pixels, and each two sub-pixels corresponds to a primary color component.

In this case, in order to reduce graininess caused by the color shift compensation when the image pixel to be detected 100 is a high-frequency image pixel, the method for detecting high-frequency components in an image of the present disclosure further includes:

step S6, adjusting an actual grayscale value of the high-frequency image pixel according to a preset adjustment algorithm and the target grayscale difference to reduce an absolute difference between the actual grayscale value and the original grayscale value of the high-frequency image pixel.

The actual grayscale value is a grayscale value acquired after the original grayscale value of the high-frequency image pixel is compensated for color shift.

Specifically, the color shift compensation process is as follows: acquiring an original grayscale value of each primary color component in a high-frequency image pixel, converting the original grayscale into a first display grayscale value and a second display grayscale value according to a color shift compensation algorithm, respectively controlling the display brightness of the two sub-pixels corresponding to the primary color component by the first display grayscale value and the second display grayscale value of each primary color component so that the two sub-pixels realize bright and dark display so as to achieve the purpose of color shift compensation. The first display grayscale value and the second display grayscale value are the actual grayscale value, and the difference between the actual grayscale value of the high-frequency image pixel and the original grayscale value is reduced, that is, to reduce the difference between light and darkness between the two sub-pixels corresponding to the respective primary color components in the high-frequency image pixel, so as to reduce the graininess caused by the color shift compensation.

Wherein the preset adjustment algorithm in step S6 is: $L'=(L-L0) \times C + L0$, where L' is an actual grayscale value adjusted by an adjusting algorithm, L0 is an original grayscale value of a high-frequency image pixel, L is an actual grayscale value of a high-frequency image pixel before being adjusted by the adjustment algorithm, C is a preset adjustment coefficient, a value range of the adjustment coefficient is 0~1, and the adjustment coefficient decreases as the target grayscale difference increases. That is, when the difference between the target grayscales is larger, the amplitude of the light-dark display after the color shift compensation process performed on the high-frequency image pixel is reduced, so that the display defect caused by the color shift compensation can be reduced.

Figure 3:
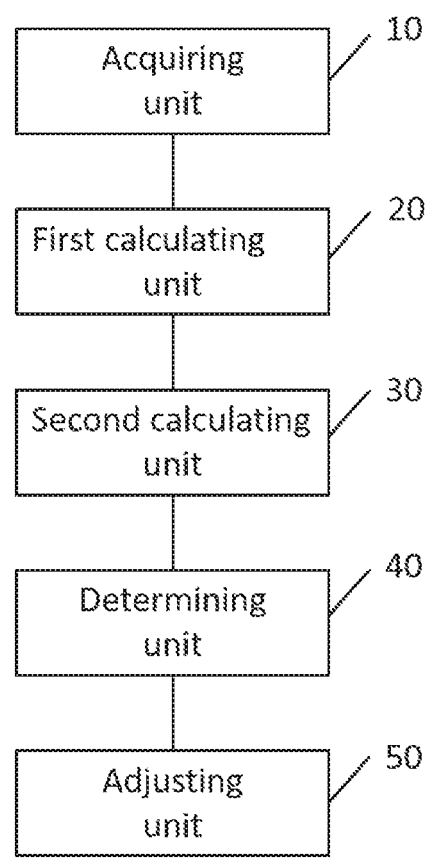
FIG. 3 is a schematic diagram of an apparatus for detecting high-frequency components in an image according to the present disclosure.

Referring to FIG. 3, the present disclosure also provides an apparatus for detecting high-frequency components in an image, including: an acquiring unit 10, a first calculating unit 20 connected to the acquiring unit 10, a second calculating unit 30 connected to the first calculating unit 20, and a determining unit 40 connected to the second calculating unit 30.

The acquiring unit 10 is for acquiring an original grayscale value of image pixels in a to-be-processed image; the image pixels including: an image pixel to be detected 100, an image pixel in a first layer 200 and an image pixel in a second layer 300; the image pixel in the first layer 200 surrounds the image pixel to be detected 100, and the image pixel in the second layer 300 surrounds the image pixel in the first layer 200.

Specifically, each image to be processed is composed of a plurality of image pixels, each of which includes a first primary color component, a second primary color component and a third primary color component. The original grayscales of the image pixels include the original grayscales of the first primary color component, the second primary color component, and the third primary color component. The display of the image is achieved by providing a grayscale value for display for each primary color component of each image pixel to control the brightness of the primary color component so that the primary color component displays a corresponding color. Preferably, the first primary color component, the second primary color component; and the third primary color component are respectively a red component, a green component and a blue component.

It can be understood that, in other embodiments of the present disclosure, each image pixel may further include a fourth primary color component; and the fourth primary color component may be a white component.

As shown in FIG. 1, under normal circumstances, the image pixel to be detected 100, the image pixel in the first layer, and the image pixel in the second layer 300 are arranged in 5 rows and 5 columns, wherein the image pixel to be detected 100 is located at the center, that is, Line 3 Column 3; the image pixel in the first layer 200 surrounds the image pixel to be detected 100, which are respectively located in Line 2 Column 2, Line 2 Column 3; Line 2 Column 4, Line 3 Column 2, Line 3 Column 4, Line 4 Column 2, Line 4 Column 3 and Line 4 Column 4; a total of eight. The remaining 16 image pixels are the image pixels in the second layer 300. Obviously, the image pixels in the second layer 300 surround the image pixels in the first layer 200.

It is understandable that, when the image pixel to be detected 100 is located at an edge or a corner of the image, the image pixel to be detected 100, the image pixel in the first layer 200, and the image pixel in the second layer 300 will not be enough to be arranged in 5 rows 5 columns. For example, when the image pixel to be detected 100 is located at a left edge of the to-be-processed image, the image pixel to be detected 100, the image pixel in the first layer 200, and the image pixel in the second layer 300 can only be arranged in 5 rows 3 columns. Wherein the image pixel to be detected 100 is located in Line 3 Column 1, the image pixel in the first layer 200 is located in Line 2 Column 1, Line 2 Column 2, Line 3 Column 2, Line 4 Column 1 and Line 4 Column 2, a total of five. The remaining nine image pixels are the image pixels in second layer 300. When the image pixel to be detected 100 is located at the right edge, the top edge, or the bottom edge, it is similar to that when the image pixel to be detected 100 is located at the left edge of the image to be processed, which is not described herein again.

When the image pixel to be detected 100 is located at the lower left corner of the image to be processed, the image pixel to be detected 100, the image pixel in the first layer 200, and the image pixel in the second layer 300 can only be arranged in 3 rows and 3 columns. The image pixel to be detected 100 is located in Line 1 Column 1, the image pixel in the first layer 200 is located in Line 2 Column 1, Line 2 Column 2 and Line 1 Column 2, a total of three. The remaining six image pixels are image pixels in the second layer 300. When the image pixel to be detected 100 is located in the upper left corner, the upper right corner and the lower right corner, it is similar to that when it is located in the lower left corner of the to-be-processed image, and details are not described herein again.

The first calculating unit 20 is configured to calculate a first difference in grayscale and a second difference in grayscale, the first grayscale difference is a maximum value of a difference between the original grayscale of the image pixel to be detected 100 and the original grayscale of each image pixel in the first layer 200; the second grayscale difference is a maximum value of the difference between the original grayscale of the image pixel to be detected 100 and the original grayscale of each image pixel in the second layer 300.

The difference between the original grayscale value of the image pixel to be detected 100 and the original grayscale value of an image pixel in the first layer 200 is: a maximum value of a difference between the original grayscale value of the first primary color component in the image pixel to be detected 100 and the original grayscale value of the first primary color component in the image pixel in the first layer 200, the difference between the original grayscale value of the second primary color component in the image pixel to be detected 100 and the original grayscale value of the second primary color component in the image pixel in the first layer 200, and the difference between the original grayscale value of the third primary color component in the image pixel to be detected 100 and the original grayscale value of the third primary color component in the image pixel in the first layer 200.

For example, taking the arrangement of the image pixels to be detected 100, the image pixels in the first layer 200 and the image pixels in the second layer 300 into 5 rows and 5 columns as an example, the calculation process of the first calculating unit 20 includes:

$F1 = \text{Max}(|R1-R0|, |B1-B0|, |G1-G0|)$ $F2 = \text{Max}(|R2-R0|, |B2-B0|, |G2-G0|)$ $F3 = \text{Max}(|R3-R0|, |B3-B0|, |G3-G0|)$ $F4 = \text{Max}(|R4-R0|, |B3-B0|, |G4-G0|)$ $F5 = \text{Max}(|R5-R0|, |B5-B0|, |G5-G0|)$ $F6 = \text{Max}(|R6-R0|, |B6-B0|, |G6-G0|)$ $F7 = \text{Max}(|R7-R0|, |B7-B0|, |G7-G0|)$ $F8 = \text{Max}(|R8-R0|, |B8-B0|, |G8-G0|)$ $FA1 = \text{Max}(F1, F2, F3, F4, F5, F6, F7, F8)$ Wherein R0, G0, and B0 respectively represent the original grayscale values of the first primary color component, the second primary color component, and the third primary color component in the image pixel to be detected 100, R1 to R8 respectively represent the original grayscale values of the first primary color components of the eight image pixels in the first layer 200, G1 to G8 respectively represent the original grayscale values of the second primary color components of the eight image pixels in the first layer 200, B1 to B8 respectively represent the original grayscale values of the third primary color components of the eight image pixels in the first layer 200, F1 to F8 respectively represent the difference between the original grayscale values of the eight image pixels in the first layer 200 and the image pixel to be detected 100, and FA1 is the first grayscale difference.

The difference between the original grayscale value of the image pixel to be detected 100 and the original grayscale value of an image pixel in the second layer 300 is: a maximum value of a difference between the original grayscale value of the first primary color component in the image pixel to be detected 100 and the original grayscale value of the first primary color component in the image pixel in the second layer 300, the difference between the original grayscale value of the second primary color component in the image pixel to be detected 100 and the original grayscale value of the second primary color component in the image pixel in the second layer 300, and the difference between the original grayscale value of the third primary color component in the image pixel to be detected 100 and the original grayscale value of the third primary color component in the image pixel in the second layer 300.

For example, taking the arrangement of the image pixels to be detected 100, the image pixels in the first layer 200 and the image pixels in the second layer 300 into 5 rows and 5 columns as an example. The calculation process of the first calculating unit 20 further includes:

$F9 = \text{Max}(|R9-R0|, |B9-B0|, |G9-G0|)$ $F10 = \text{Max}(|R10-R0|, |B10-B0|, |G10-G0|)$ $F11 = \text{Max}(|R11-R0|, |B13-B0|, |G11-G0|)$ $F12 = \text{Max}(|R12-R0|, |B12-B0|, |G12-G0|)$ $F13 = \text{Max}(|R13-R0|, |B13-B0|, |G13-G0|)$ $F14 = \text{Max}(|R14-R0|, |B14-B0|, |G14-G0|)$ $F15 = \text{Max}(|R15-R0|, |B15-B0|, |G15-G0|)$ $F16 = \text{Max}(|R16-R0|, |B16-B0|, |G16-G0|)$ $F17 = \text{Max}(|R17-R0|, |B17-B0|, |G17-G0|)$ $F18 = \text{Max}(|R18-R0|, |B18-B0|, |G18-G0|)$ $F19 = \text{Max}(|R19-R0|, |B19-B0|, |G19-G0|)$ $F20 = \text{Max}(|R20-R0|, |B20-B0|, |G20-G0|)$ $F21 = \text{Max}(|R21-R0|, |B21-B0|, |G21-G0|)$ $F22 = \text{Max}(|R22-R0|, |B22-B0|, |G22-G0|)$ $F23 = \text{Max}(|R23-R0|, |B23-B0|, |G23-G0|)$ $F24 = \text{Max}(|R24-R0|, |B24-B0|, |G24-G0|)$ $FA2 = \text{Max}(F9, F10, F11, F12, F13, F14, F15, F16, F17, F18, F19, F20, F21, F22, F23, F24)$ Wherein R0, G0, and B0 respectively represent the original grayscale values of the first primary color component, the second primary color component, and the third primary color component in the image pixel to be detected 100, R9 to R24 respectively represent the original grayscale values of the first primary color components of the sixteen image pixels in the second layer 300, G9 to G24 respectively represent the original grayscale values of the second primary color components of the 16 image pixels in the second layer 300, B9 to B24 respectively represent the original grayscale values of the third primary color components of the sixteen image pixels in the second layer 300, F9 to F24 respectively represent the difference between the original grayscale values of the 16 image pixels 300 in the second layer and the image pixel to be detected 100, and FA2 represents the second grayscale difference.

The second calculating unit 30 is configured to calculate the target grayscale difference according to the target grayscale difference algorithm, the first grayscale difference, and the second grayscale difference.

Specifically, the target grayscale difference algorithm is: $F=a \times FA1+b \times FA2$, where F is a target grayscale difference, FA1 is a first grayscale difference, FA2 is a second grayscale difference, a is a preset first weight value, b is a preset second weight value. By adjusting the specific sizes of a and b, the target grayscale difference can be changed.

The determining unit 40 is configured to compare the target grayscale difference with a preset grayscale threshold value, if the target grayscale difference is greater than the grayscale threshold value, it is determined that the image pixel to be detected 100 is a high-frequency image pixel; otherwise, it is determined that the image pixel to be detected is a low-frequency image pixel.

Specifically, the apparatus for detecting the high-frequency component in an image further includes: an adjusting unit 50 connected to the determining unit 40.

The adjusting unit 50 is configured to adjust an actual grayscale value of the high-frequency image pixel according to a preset adjustment algorithm and a target grayscale difference to reduce the difference between the actual grayscale value of the high-frequency image pixel and the original grayscale value; the actual grayscale value is a grayscale value obtained after the original grayscale value of the high-frequency image pixel is compensated for color shift.

Specifically, the color shift compensation process is as follows: acquiring an original grayscale value of each primary color component in a high-frequency image pixel, converting the original grayscale into a first display grayscale value and a second display grayscale value according to a color shift compensation algorithm, respectively controlling the display brightness of the two sub-pixels corresponding to the primary color component by the first display grayscale value and the second display grayscale value of each primary color component so that the two sub-pixels realize bright and dark display so as to achieve the purpose of color shift compensation. The first display grayscale value and the second display grayscale value are the actual grayscale value, and the difference between the actual grayscale value of the high-frequency image pixel and the original grayscale value is reduced, that is, to reduce the difference between light and darkness between the two sub-pixels corresponding to the respective primary color components in the high-frequency image pixel, so as to reduce the graininess caused by the color shift compensation.

Wherein the preset adjustment algorithm in step S6 is: $L'=(L-L0) \times C+L0$, where L' is an actual grayscale value adjusted by an adjusting algorithm, L0 is an original grayscale value of a high-frequency image pixel, L is an actual grayscale value of a high-frequency image pixel before being adjusted by the adjustment algorithm, C is a preset adjustment coefficient, a value range of the adjustment coefficient is 0~1, and the adjustment coefficient decreases as the target grayscale difference increases. That is, when the difference between the target grayscales is larger, the amplitude of the light-dark display after the color shift compensation process performed on the high-frequency image pixel is reduced, so that the display defect caused by the color shift compensation can be reduced.

In summary, the present disclosure provides a method of detecting high-frequency components in an image, using the maximum value of the difference between the original grayscale value of the image pixel to be detected and the original grayscale value of each image pixel in the first layer as the first grayscale difference, using the maximum value of the difference between the original grayscale value of the image pixel to be detected and the original grayscale value of each image pixel located at the second layer as the second grayscale difference, calculating the target grayscale difference according to the target grayscale difference algorithm, the first grayscale difference and the second grayscale difference, comparing the target grayscale difference with a preset grayscale threshold value to determine whether the image pixel to be detected is a high-frequency image pixel, and adjusting the actual grayscale value of the high-frequency image pixel to reduce the difference between the actual grayscale value of the high-frequency image pixel and the original grayscale value. It can optimize the detection process of high-frequency components in the image and improve the poor display caused by the color shift compensation algorithm to improve the display quality. The present disclosure also provides an apparatus for detecting high-frequency components in an image, which can optimize the detection process of high-frequency components in the image, improve the display defect caused by adopting the color shift compensation algorithm, and improve the display quality.

As above, for those skilled in the art, various other appropriate changes and modifications may be made according to the technical solutions and technical solutions of the present disclosure, and all such changes and modifications shall fall within the protection scope of the appended claims of the present disclosure.

What is claimed is:

1. A method for detecting high-frequency components in an image, comprising the following steps:
    step S1, acquiring an original grayscale value of image pixels in a to-be-processed image, the image pixels comprising: an image pixel to be detected, an image pixel in a first layer and an image pixel in a second layer;
    the image pixel in the first layer surrounding the image pixel to be detected, the image pixel in the second layer surrounding the image pixel in the first layer;
    step S2, calculating a first grayscale difference that is a maximum value of a difference between the original grayscale value of the image pixel to be detected and the original grayscale value of each image pixel in the first layer;
    step S3, calculating a second grayscale difference that is a maximum value of a difference between the original grayscale value of the image pixel to be detected and the original grayscale value of each image pixel in the second layer;

step S4, calculating the target grayscale difference according to a target grayscale difference algorithm, the first grayscale difference and the second grayscale difference;

step S5, comparing the target grayscale difference with a preset grayscale threshold value, if the target grayscale difference is greater than the grayscale threshold value, determining that the image pixel to be detected is a high-frequency image pixel; otherwise, determining that the image pixel to be detected is a low-frequency image pixel.

2. The method for detecting high-frequency components in an image according to claim 1, wherein when the image pixel to be detected is a high-frequency image pixel, the method further comprises:

step S6, adjusting an actual grayscale value of the high-frequency image pixel according to a preset adjustment algorithm and the target grayscale difference to reduce an absolute difference between the actual grayscale value and the original grayscale value of the high-frequency image pixel;

the actual grayscale value is a grayscale value acquired after the original grayscale value of the high-frequency image pixel is compensated for color shift.

3. The method for detecting high-frequency components in an image according to claim 1, wherein the target grayscale difference algorithm in step S4 is:

$F=a\times FA1+b\times FA2$, where F is the target grayscale difference, FA1 is the first grayscale difference, FA2 is the second grayscale difference, a is a preset first weight value, and b is a preset second weight value.

4. The method for detecting high-frequency components in an image according to claim 1, wherein each image pixel in step S1 comprises a first primary color component, a second primary color component, and a third primary color component:

the original grayscale value of each image pixel comprises the original grayscale value of the first primary color component, the original grayscale value of the second primary color component, and the original grayscale value of the third primary color component;

the difference between the original grayscale value of the image pixel to be detected and the original grayscale value of an image pixel in the first layer is: a maximum value of a difference between the original grayscale value of the first primary color component in the image pixel to be detected and the original grayscale value of the first primary color component in the image pixel in the first layer, a difference between the original grayscale value of the second primary color component in the image pixel to be detected and the original grayscale value of the second primary color component in the image pixel in the first layer, and a difference between the original grayscale value of the third primary color component in the image pixel to be detected and the original grayscale value of the third primary color component in the image pixel in the first layer;

the difference between the original grayscale value of the image pixel to be detected and the original grayscale value of an image pixel in the second layer is: a maximum value of a difference between the original grayscale value of the first primary color component in the image pixel to be detected and the original grayscale value of the first primary color component in the image pixel in the second layer, a difference between the original grayscale value of the second primary color component in the image pixel to be detected and the original grayscale value of the second primary color component in the image pixel in the second layer, and a difference between the original grayscale value of the third primary color component in the image pixel to be detected and the original grayscale value of the third primary color component in the image pixel in the second layer.

5. The method for detecting high-frequency components in an image according to claim 2, wherein the preset adjustment algorithm in step S6 is: $L'=(L-L0)\times C+L0$, where L' is an actual grayscale value adjusted by an adjusting algorithm, L0 is an original grayscale value of a high-frequency image pixel, L is an actual grayscale value of a high-frequency image pixel before being adjusted by the adjustment algorithm, C is a preset adjustment coefficient, a value range of the adjustment coefficient is 0~1, and the adjustment coefficient decreases as the target grayscale difference increases.

6. An apparatus for detecting high-frequency components in an image, comprising: an acquiring unit, a first calculating unit connected to the acquiring unit, a second calculating unit connected to the first calculating unit, and a determining unit connected to the second calculating unit;

the acquiring unit is for acquiring an original grayscale value of image pixels in a to-be-processed image, the image pixels comprising: an image pixel to be detected, an image pixel in a first layer and an image pixel in a second layer;

the first calculating unit is for calculating a first grayscale difference and a second grayscale difference, the first grayscale difference is a maximum value of a difference between the original grayscale value of the image pixel to be detected and the original grayscale value of each image pixel in the first layer; the second grayscale difference is a maximum value of a difference between the original grayscale value of the image pixel to be detected and the original grayscale value of each image pixel in the second layer;

the second calculating unit is for calculating the target grayscale difference according to a target grayscale difference algorithm, the first grayscale difference and the second grayscale difference;

the determining unit is for comparing the target grayscale difference with a preset grayscale threshold value, if the target grayscale difference is greater than the grayscale threshold value, determining that the image pixel to be detected is a high-frequency image pixel; otherwise, determining that the image pixel to be detected is a low-frequency image pixel.

7. The apparatus for detecting high-frequency components in an image according to claim 6, further comprises: an adjusting unit connected to the determining unit;

the determining unit is for adjusting an actual grayscale value of the high-frequency image pixel according to a preset adjustment algorithm and the target grayscale difference to reduce an absolute difference between the actual grayscale value and the original grayscale value of the high-frequency image pixel; the actual grayscale value is a grayscale value acquired after the original grayscale value of the high-frequency image pixel is compensated for color shift.

8. The apparatus for detecting high-frequency components in an image according to claim 6, wherein the target grayscale difference algorithm in step S4 is: $F=a\times FA1+b\times FA2$, where F is the target grayscale difference, FA1 is the first grayscale difference, FA2 is the second grayscale difference, a is a preset first weight value, and b is a preset second weight value.

9. The apparatus for detecting high-frequency components in an image according to claim 6, wherein each image pixel comprises a first primary color component, a second primary color component and a third primary color component arranged in sequence;

the difference between the original grayscale value of the image pixel to be detected and the original grayscale value of an image pixel in the first layer is: a maximum value of a difference between the original grayscale value of the first primary color component in the image pixel to be detected and the original grayscale value of the first primary color component in the image pixel in the first layer, a difference between the original grayscale value of the second primary color component in the image pixel to be detected and the original grayscale value of the second primary color component in the image pixel in the first layer, and a difference between the original grayscale value of the third primary color component in the image pixel to be detected and the original grayscale value of the third primary color component in the image pixel in the first layer;

the difference between the original grayscale value of the image pixel to be detected and the original grayscale value of an image pixel in the second layer is: a maximum value of a difference between the original grayscale value of the first primary color component in the image pixel to be detected and the original grayscale value of the first primary color component in the image pixel in the second layer, a difference between the original grayscale value of the second primary color component in the image pixel to be detected and the original grayscale value of the second primary color component in the image pixel in the second layer, and a difference between the original grayscale value of the third primary color component in the image pixel to be detected and the original grayscale value of the third primary color component in the image pixel in the second layer.

10. The apparatus for detecting high-frequency components in an image according to claim 6, wherein the preset adjustment algorithm is: $L'=(L-L0)\times C+L0$, where $L'$ is an actual grayscale value adjusted by an adjusting algorithm, $L0$ is an original grayscale value of a high-frequency image pixel, $L$ is an actual grayscale value of a high-frequency image pixel before the adjustment algorithm is adjusted, $C$ is a preset adjustment coefficient, a value range of the adjustment coefficient is 0~1, and the adjustment coefficient decreases as the target grayscale difference increases.

11. A method for detecting high-frequency components in an image comprises the following steps:

step S1, acquiring an original grayscale value of image pixels in a to-be-processed image, the image pixels comprising: an image pixel to be detected, an image pixel in a first layer and an image pixel in a second layer;

the image pixel in the first layer surrounding the image pixel to be detected, the image pixel in the second layer surrounding the image pixel in the first layer;

step S2, calculating a first grayscale difference that is a maximum value of a difference between the original grayscale value of the image pixel to be detected and the original grayscale value of each image pixel in the first layer;

step S3, calculating a second grayscale difference that is a maximum value of a difference between the original grayscale value of the image pixel to be detected and the original grayscale value of each image pixel in the second layer;

step S4, according to a target grayscale difference algorithm, the first grayscale difference and the second grayscale difference to calculate the target grayscale difference;

step S5, comparing the target grayscale difference with a preset grayscale threshold value, if the target grayscale difference is greater than the grayscale threshold value, determining that the image pixel to be detected is a high-frequency image pixel; otherwise, determining that the image pixel to be detected is a low-frequency image pixel;

wherein when the image pixel to be detected is a high-frequency image pixel, the method further comprises:

step S6, adjusting an actual grayscale value of the high-frequency image pixel according to a preset adjustment algorithm and the target grayscale difference to reduce an absolute difference between the actual grayscale value and the original grayscale value of the high-frequency image pixel;

the actual grayscale value is a grayscale value acquired after the original grayscale value of the high-frequency image pixel is compensated for color shift;

wherein the target grayscale difference algorithm in step S4 is: $F=a\times FA1+b\times FA2$, where F is the target grayscale difference, FA1 is the first grayscale difference, FA2 is the second grayscale difference, a is a preset first weight value, and b is a preset second weight value;

wherein each image pixel in step S1 comprises a first primary color component, a second primary color component, and a third primary color component;

the original grayscale value of each image pixel comprises the original grayscales of the first primary color component, the original grayscales of the second primary color component, and the original grayscales of the third primary color component;

the difference between the original grayscale value of the image pixel to be detected and the original grayscale value of an image pixel in the first layer is: a maximum value of a difference between the original grayscale value of the first primary color component in the image pixel to be detected and the original grayscale value of the first primary color component in the image pixel in the first layer, a difference between the original grayscale value of the second primary color component in the image pixel to be detected and the original grayscale value of the second primary color component in the image pixel in the first layer, and a difference between the original grayscale value of the third primary color component in the image pixel to be detected and the original grayscale value of the third primary color component in the image pixel in the first layer;

the difference between the original grayscale value of the image pixel to be detected and the original grayscale value of an image pixel in the second layer is: a maximum value of a difference between the original grayscale value of the first primary color component in the image pixel to be detected and the original grayscale value of the first primary color component in the image pixel in the second layer, a difference between the original grayscale value of the second primary color component in the image pixel to be detected and the original grayscale value of the second primary color component in the image pixel in the second layer, and a difference between the original grayscale value of the third primary color component in the image pixel to be detected and the original grayscale value of the third primary color component in the image pixel in the second layer;

wherein the preset adjustment algorithm in step S6 is: $L'=(L-L0) \times C+L0$, where $L'$ is an actual grayscale value adjusted by an adjusting algorithm, $L0$ is an original grayscale value of a high-frequency image pixel, $L$ is an actual grayscale value of a high-frequency image pixel before the adjustment algorithm is adjusted, $C$ is a preset adjustment coefficient, a value range of the adjustment coefficient is 0~1, and the adjustment coefficient decreases as the target grayscale difference increases.

* * * * *